Figure 1:
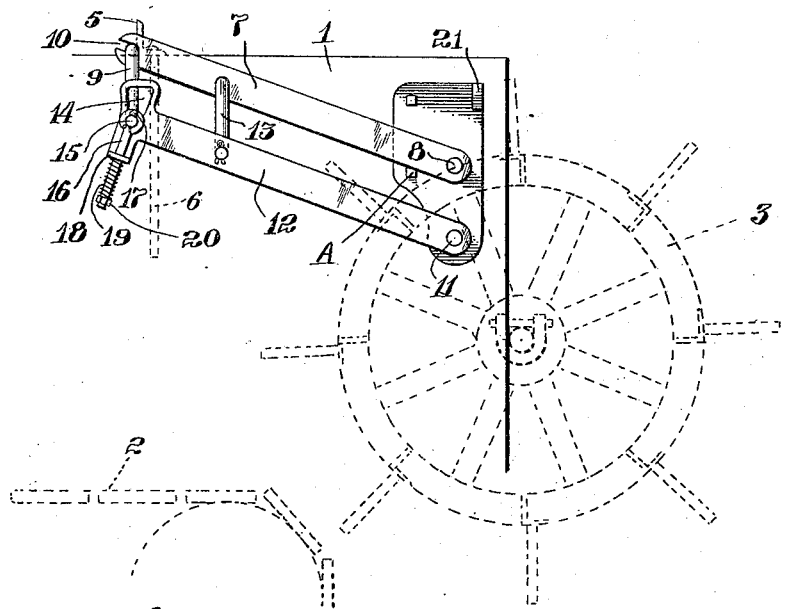

W. J. COOK.
MANURE SPREADER.
APPLICATION FILED JUNE 5, 1912.

1,191,670.

Patented July 18, 1916.
3 SHEETS—SHEET 1.

Attest:

Inventor:
Willard J. Cook
by Rogers, Kennedy & Campbell Attys

W. J. COOK.
MANURE SPREADER.
APPLICATION FILED JUNE 5, 1912.

1,191,670.

Patented July 18, 1916.
3 SHEETS—SHEET 2.

Attest:

Inventor:
Willard J. Cook
by Rogers, Kennedy, Campbell Attys

W. J. COOK.
MANURE SPREADER.
APPLICATION FILED JUNE 5, 1912.

1,191,670.

Patented July 18, 1916.
3 SHEETS—SHEET 3.

Attest:

Inventor:
Willard J. Cook
by
Rogers, Kennedy & Campbell Attys

UNITED STATES PATENT OFFICE.

WILLARD J. COOK, OF MOLINE, ILLINOIS, ASSIGNOR TO MOLINE PLOW COMPANY, A CORPORATION OF ILLINOIS.

MANURE-SPREADER.

1,191,670.  Specification of Letters Patent.  Patented July 18, 1916.

Application filed June 5, 1912. Serial No. 701,720.

*To all whom it may concern:*

Be it known that I, WILLARD J. COOK, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in manure spreaders, and has reference more particularly to the so-called rake mechanism which is usually employed to control the presentation of the material to the beater or distributing mechanism.

In a common type of manure spreader the body of manure is advanced rearwardly to the action of a distributing mechanism usually in the form of a rotary beater cylinder, the action of which is to detach portions of the material and spread or distribute the same over the surface of the ground. In loading the manure into the wagon body while the feeding and distributing mechanisms are at rest, it is usual to employ in front of the beater, a gate or barrier commonly in the form of a rake, consisting of teeth or rods depending from a transverse bar, so that as the material is shoveled in, it will be prevented from piling up against the beater and in such wise clogging the action of the same when the beater begins its rotation. With the use of such a gate or barrier it is necessary to remove it when the feeding mechanism is set in motion, so as to allow the material to be presented to the action of the same, and in order to prevent unduly large chunks of material from being fed to the beater, and to insure a uniform action, the rake is so positioned when removed that it will act on the material as it is fed to the beater.

My invention consists of an improved form of rake mechanism designed to subserve these two functions, that is, when in one position to act as a barrier or gate, and when in another position to insure the feed of the material to the beater in a proper and uniform condition; and in accordance with my invention, the rake possessing these functions, is so constructed that it will be operated entirely in an automatic manner, the said rake when in a lowered position (when the manure is being shoveled into the machine), being locked in an upright obstructing position, and being adapted, when the feed of material begins, to be automatically elevated thereby, and by such automatic elevation to be automatically unlocked so that it will perform its regulating action, and being adapted also when the material has all been distributed, to drop automatically to its former lowered position, and by such dropping action to again become automatically locked.

In its more specific embodiment, the rake is carried by swinging supports mounted on the body of the machine so that they may be swung up and down, the rake being pivotally mounted in the supports so that it may swing back and forth, suitable means being provided of such form and construction that when the supports are swung downwardly, the rake will occupy an upright position and will be automatically locked against relative swinging motion, and when the supports are swung upwardly, the rake will be automatically unlocked so as to be capable of its back and forth swinging movements relative to the supports.

Figure 2:
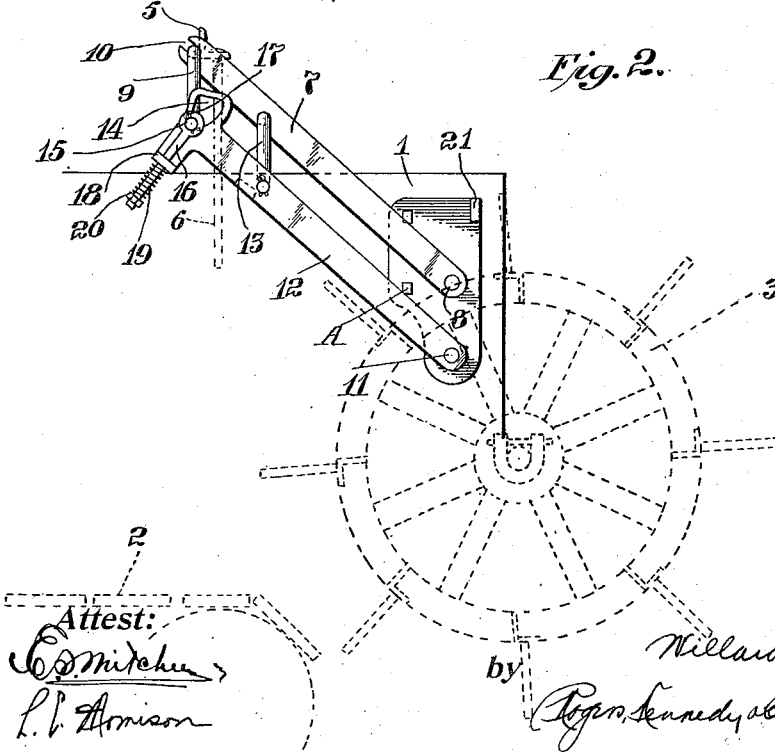
Figure 3:
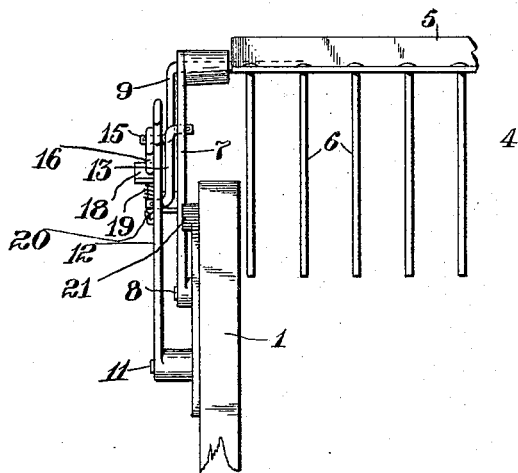
Figure 4:
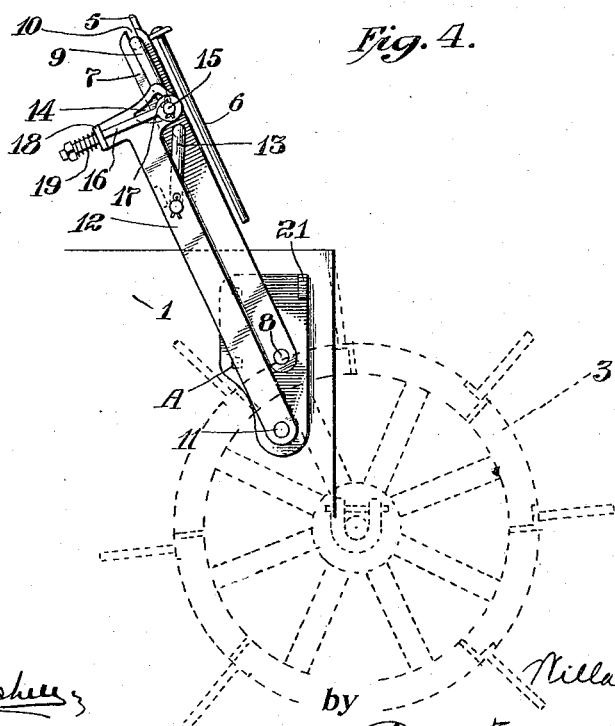
Figure 5:
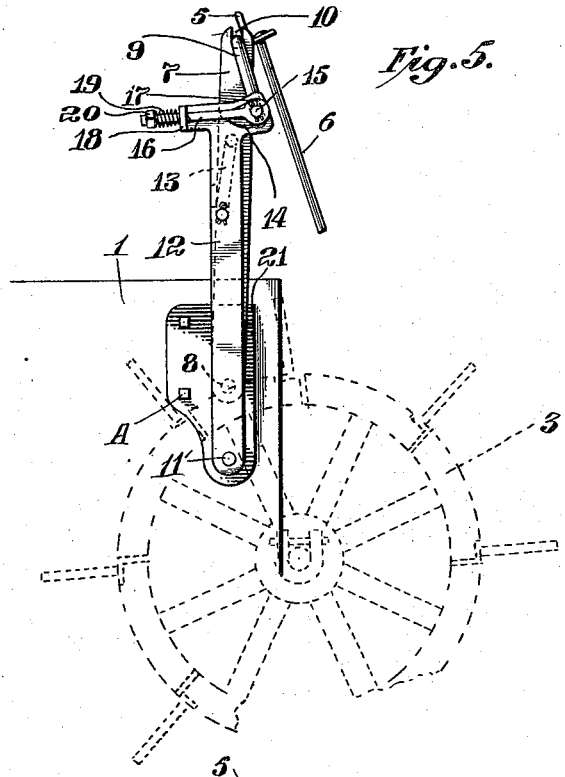
Figure 6:
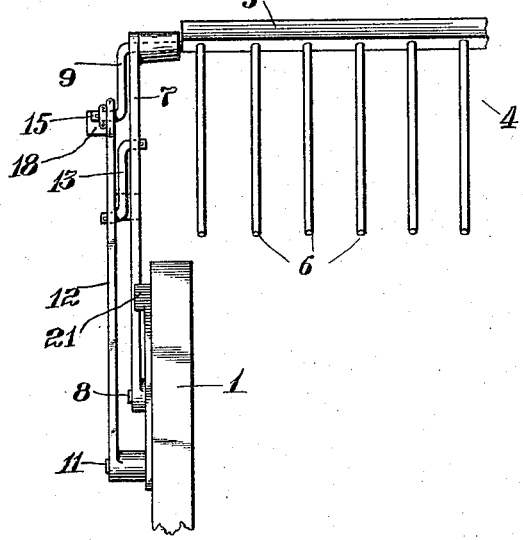

In the accompanying drawings: Figure 1 is a side elevation of the distributing end of a manure spreader having my improved rake mechanism applied thereto, the same being in its lowered position to act as a gate or barrier. Fig. 2 is a similar view showing the mechanism partially raised, with the rake still locked. Fig. 3 is a rear elevation of the same. Fig. 4 is a side elevation showing the rake mechanism raised still further, with the rake unlocked. Fig. 5 is a similar view showing the rake mechanism elevated to its highest point. Fig. 6 is a rear elevation of the same.

Referring to the drawings, 1 represents the body of a manure spreader equipped with means for advancing the manure rearwardly, such means in the present instance being in the form of a feeding apron 2, in the bottom of the body.

3 represents a distributing mechanism in the form of a rotary toothed beater cylinder, which is mounted in suitable bearings in the body, in such relation to the delivery end of the apron that the manure supported by the apron will be fed to the action of the beater.

My improved rake mechanism comprises a rake proper 4, consisting of a transverse horizontal bar 5, from which depend a number of rake teeth 6, 6, etc. This rake is mounted in the upper ends of two supporting links 7, in such manner that it may swing back and forth in relation to the supporting links, the rear ends of which latter are pivotally mounted on horizontal studs, 8, projecting from opposite sides of the body, so as to be capable of an up and down swinging movement around a transverse horizontal axis coincident with said studs. As a convenient means for mounting the rake swingingly between the supports, the bar 5 has fixed to its opposite ends, projecting arms 9, 9, extending in sockets 10, 10, in the upper ends of the respective links, 7, by which construction the rake is so supported by the links that it may swing on a transverse axis coincident with the arms 9.

As a result of the construction described, the rake is adapted by the downward swinging movement of the links 7, to be lowered to the position shown in Fig. 1, and by the upward movement of the links to the position shown in Fig. 4. In order that when in lowered position the rake teeth will be maintained in an upright position so as to act as a gate or barrier, and in order that when the supporting links are swung upwardly, the rake will be released so that it may perform its usual functions during the feeding of the material, I pivot to opposite sides of the machine on horizontal projecting studs 11, members for controlling the actions of the rake, such members being preferably in the form of links 12, 12, operatively connected with the supporting links, 7, 7, by coupling rods 13, 13, one end of the rods being jointed to the links 7, and the opposite ends of the rods being jointed to the links 12, whereby the rake-control-link links are caused to be moved up and down in parallelism with the supporting links. At their forward ends the controlling links are each provided with an opening 14, which extends transversely of the links, and the ends of the arms 9 are extended in the form of cranks 15, 15, which project into said openings and which have jointed to their projecting ends at the outer side of the controlling links, eye-bolts 16, 16, held on the cranks by cotter pins 17, 17, or other suitable means. These eye-bolts extend loosely through laterally projecting lips 18, 18, on the controlling links, and are encircled by springs 19, 19, bearing at one end against heads 20, 20, on the bolts, and at their opposite ends against the lips, these springs tending to hold the cranks in the forward ends of the openings 14, but permitting the cranks to shift rearwardly in the openings and the rake to move rearwardly to the position shown in Fig. 5. The walls of the openings 14 in the controlling links constitute in effect cam surfaces which are of such form and so related to the supporting links and the cranks and swinging rake, that when the supporting links are in lowered position, as shown in Fig. 1, the cranks will be held by the walls of the openings with the rake teeth locked in an upright position. When, however, the supporting links are swung upwardly to the position shown in Fig. 4, by reason of the fact that the supporting links and controlling links move in parallelism on different axes, they will assume such relative positions that the cranks will be free to move in the openings and the rake will consequently be unlocked and subject to the action of the springs 19. When the supporting links are in a lowered position, as shown in Fig. 1, they will extend at an upward inclination from the horizontal and will be supported in this position by means of stop lugs A, A projecting outwardly from the outer sides of the machine, in position to be engaged by the upper links 7. These stop lugs limit the downward movement of the links when the rake drops down by gravity, and by sustaining the links at the upward inclination described, the pressure of the manure against the rake teeth, in the feeding action of the load to the distributer, will not be exerted in a direct horizontal line on the axis of the links which would fail to effect the elevation of the latter, but the force is exerted with a lifting effect on the links. These stop lugs serve therefore to limit the gravitating fall of the rake mechanism and they support said mechanism in such position that the load in its feeding movement toward the distributer acting on the rake teeth will automatically raise said mechanism and rake. The rake mechanism described, acts with a floating effect in that it tends by gravity to coöperate with the body of manure, and the construction is such that the advance of the material in the feeding movement of the machine will act automatically to raise the rake from its obstructing position to its normally acting position, and when all the material has been distributed, the rake will, by gravity, move back to its former obstructing position. Therefore the mechanism is wholly automatic in its action, the starting of the feeding movement of the manure to the beater, serving to automatically lift the rake from its obstructing position, and causing it to assume a position for its normal screening action, and the exhaust of the load permitting the rake to fall back to its former position, these movements being attended with the automatic unlocking of the rake and its automatic locking respectively. As a result of this action, it is not necessary to employ manual or other means for controlling the rake, so that the driver is relieved of the labor and attention which it would otherwise be necessary to devote to such manual control.

In the operation of the machine, after the previous load has been distributed, the rake is in the position shown in Fig. 1, and locked with the teeth upright so as to form a rigid barrier in front of the beater, and in this position the rake will prevent the material as it is shoveled into the machine, from piling up against the beater. When the feeding and distributing mechanisms are started, the advance of the material begins, and as the rear end of the body of manure encounters the upright rake teeth, the entire mechanism will be swung upwardly bodily to the position shown in Fig. 2, with the rake still locked. The manure is now acted on by the beater and the parts next assume the position shown in Fig. 4, the two sets of links in assuming this position, effecting a release of the cranks and a consequent unlocking of the rake, which is now in a position to act with a floating effect and swing back and forth in relation to the supports subject to the action of the spring. If the load is heavy and high, the links may be carried by the same to its extreme vertical position as shown in Fig. 5, which is the normally operative position of the rake. The parts continue to operate in a raised unlocked position until the load has been distributed, and the pressure of the load against the teeth being then removed, the mechanism will fall by gravity to its former loading position, as shown in Fig. 1, the cranks 15, 15, being drawn forwardly in the openings 14 by the springs, and the two sets of links in this return movement assuming such relative positions that the cranks will be again locked by the cam surfaces of the openings 14, and the rake will be maintained in an upright obstructing position.

In order that the suporting links will be prevented from swinging too far to the rear, with a consequent failure to fall by gravity when the load has been distributed, I fix to the outer side of the machine, stop lugs 21, 21, adapted to be encountered by the rear edges of the supporting links when the latter are raised to their highest point, these lugs being so positioned relative to the axes of the links, that the center of gravity will be forward of the axis, and consequently the parts will have a tendency to fall forward.

From the foregoing description it will be observed that the movement of the rake bodily upward by the feed of the material from the position shown in Fig. 4, is attended by an automatic unlocking of the rake, so that it then may swing back and forth in its supports subject to the action of the springs. And further it will be seen that the fall of the mechanism forward from the position shown in Fig. 5 to that shown in Fig. 1, will cause the rake to be automatically locked again with the teeth in an upright position.

In the accompanying drawings I have shown my invention in the particular embodiment and details which I prefer to adopt, and which in practice has been found to answer to a satisfactory degree the ends to be attained, but it will be understood that these details may be variously modified and changed within the skill of the mechanic, and that the invention is not limited to any particular form or construction of the parts except in so far as such limitations are specified in the claims.

Having thus described my invention, what I claim is:

1. In combination with a manure spreader, a rising and falling rake mechanism movable freely up and down automatically, said mechanism including a rake movable back and forth relatively thereto, and means acting automatically on the lowering of the said mechanism to lock the rake against said relative movement, said mechanism being so sustained when in lowered position that it will be raised automatically by the feed of the manure to the spreader.

2. In combination with a manure spreader, a rake mechanism movable upwardly automatically and adapted to move by gravity from an upper position downwardly to a lower position, and provided with a relatively movable rake, means controlled by the downward movement of the rake mechanism for locking the rake against said relative movement, and a stop device in position to limit the downward movement of the rake mechanism and to support the same in such position that it will be raised automatically by the feed of the manure.

3. In combination with a manure spreader, a rake mechanism movable upwardly automatically and provided with a relatively movable rake adapted to be locked when the rake mechanism is in lowered position, means operating on the upward movement of the rake mechanism to automatically unlock the rake, and a stop device in position to limit the downward movement of the rake mechanism and to support the same in such position that it will be raised automatically by the feed of the manure.

4. In combination with a manure spreader, a rake mechanism movable up and down automatically and provided with a relatively movable rake adapted to be locked and unlocked respectively, means operating automatically on the downward movement of the rake mechanism to lock the rake, and operating automatically on the upward movement of the rake mechanism to unlock the rake, and a stop device in position to limit the downward movement of the rake mechanism and to support the same in such position that it will be raised automatically by the feed of the manure.

5. In a manure spreader, the combination of a rake support movable up and down automatically, a rake carried thereby and movable bodily with the support up and down and movable also relatively to the support, said rake adapted to be locked and unlocked respectively with reference to the support, means operating automatically to lock the rake on the downward movement of the support, and acting automatically to unlock the rake on the upward movement of the support, and a stop device in position to limit the downward movement of the rake support and to sustain the same in such position that it will be raised automatically by the feed of the manure.

6. In combination with a manure spreader, a rake movable bodily up and down automatically and movable relatively rearwardly, automatic means controlled by the downward movement of the rake for locking the same against said relative rearward movement, and acting to automatically unlock the rake when the same is moved bodily upward, and a stop device in position to limit the downward movement of the rake and to support the same in such position that it will be raised automatically by the feed of the manure.

7. In combination with a manure spreader having means to advance the manure, a rake movable bodily up and down and also relatively rearwardly and adapted to occupy a lowered position in the path of the advancing manure, and adapted to be moved upward automatically thereby, means for locking the rake against relative rearward movement when down, means controlled by the upward movement of the rake for unlocking the same, and a stop device in position to limit the downward movement of the rake and to sustain the same in such position that it will be raised automatically by the feed of the manure.

8. In combination with a manure spreader having means for advancing the manure, a rake movable bodily up and down and adapted to be moved upwardly by the advancing manure, said rake being capable also of a relative rearward movement, means controlled by the downward bodily movement of the rake for locking the same against said relative rearward movement, and a stop device in position to limit the downward movement of the rake and to sustain the same in such position that it will be raised automatically by the feed of the manure.

9. In combination with a manure spreader, a gravitating rake movable upwardly automatically by the engagement therewith of the manure, and movable downwardly by gravity, said rake being capable of a rearward movement relatively to its up and down movements, means controlled by the downward movement of the rake for locking it against relative rearward movement, said means acting on the upward movement of the rake to unlock it, and means for limiting the downward movement of the rake and for sustaining it in such position that it will be raised automatically by the feed of the manure.

10. In combination with a manure spreader having means for advancing the manure, a rake adapted to occupy a lower upright position in the path of the manure and movable upwardly, means for locking the rake in said upright position so as to form a gate or barrier, said rake being adapted to be moved bodily upwardly by the advancing manure while locked in an upright position, means controlled by said upward movement for unlocking the rake, and a stop device in position to limit the downward movement of the rake and to sustain the same in such position that it will be raised automatically by the advancing manure.

11. In combination with a manure spreader, supports mounted thereon to swing up and down automatically, a rake mounted in said supports to swing relatively thereto, means controlled by the downward swinging movement of the supports for locking the rake against relative movement, and acting when the supports are swung upwardly, to unlock the rake, and stop devices in position to be engaged by said supports to limit the downward movement of the same, said stop devices serving to sustain the supports in such position that they will be raised automatically by the engagement of the advancing manure with the rake.

12. In combination with a manure spreader, supports mounted thereon to swing up and down automatically, a rake pivotally mounted in said supports to swing back and forth relatively thereto and adapted when the supports are lowered to occupy an upright position, a spring tending to hold the rake against back movement, a member operatively connected with the supports and engaging the rake, and acting to lock the rake in upright position when the supports are in lowered position, and operating to automatically unlock the rake when the supports are raised, and stop devices in position to be engaged by the supports to limit their downward movement, said stop devices acting to sustain the supports in such position that they will be raised automatically by the engagement of the feeding manure with the rake.

13. In combination with a manure spreader, supports mounted thereon to swing up and down, a rake pivotally mounted in said supports to swing back and forth relatively thereto, an arm on the rake, and a link having a cam surface engaging the arm, said cam surface being of such form and so related to the other parts that when the supports are swung downwardly the rake will be locked automatically in an upright position, and when the supports are swung upwardly the rake will be released, and connections between the link and support to cause the same to move in parallelism.

In testimony whereof I affix my signature in presence of two witnesses.

WILLARD J. COOK.

Witnesses:
T. C. BLANDING,
JAMES J. LAMB.